F. X. MALOCSAY.
BANDING MACHINE.
APPLICATION FILED MAY 2, 1912.

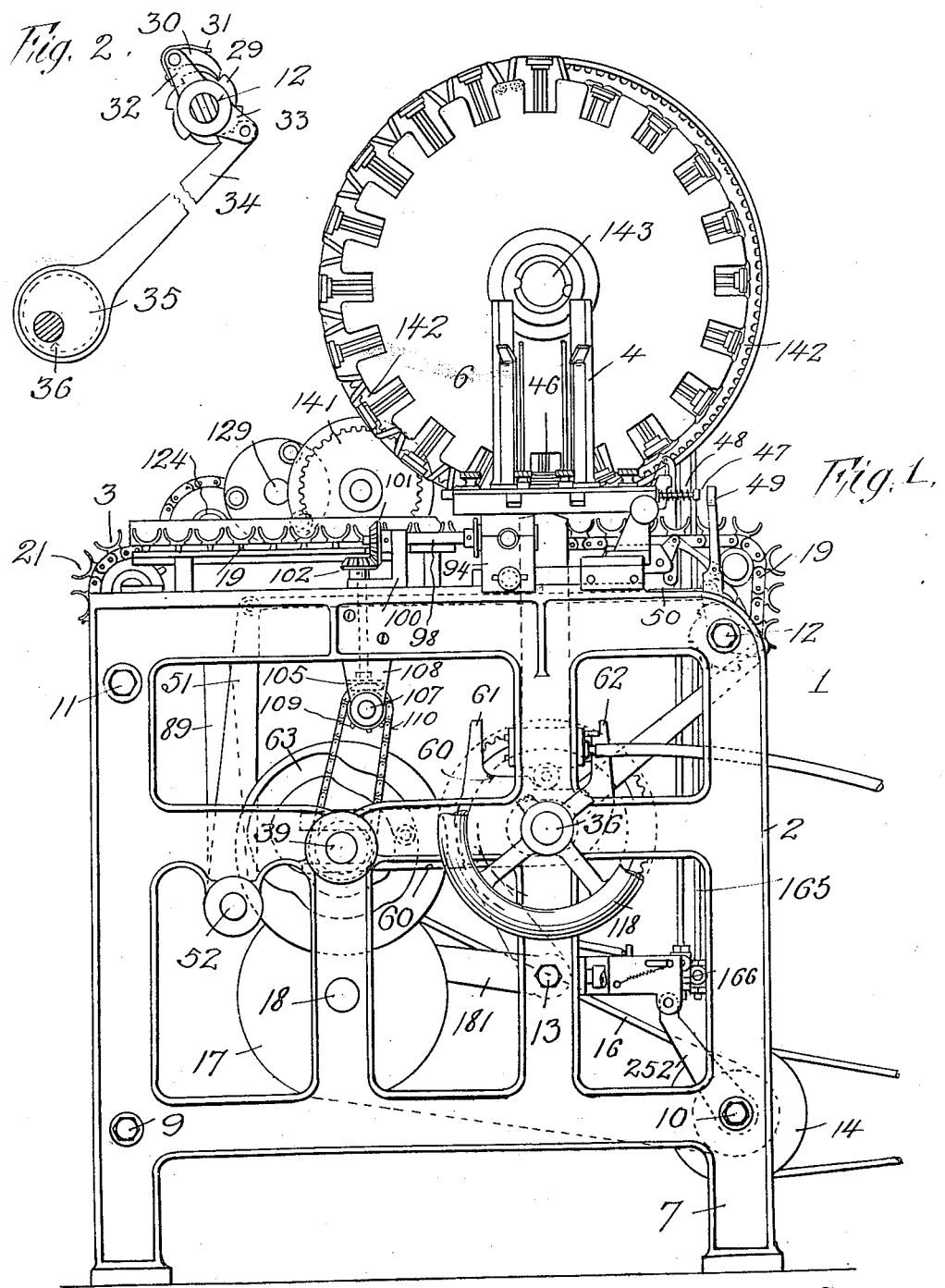

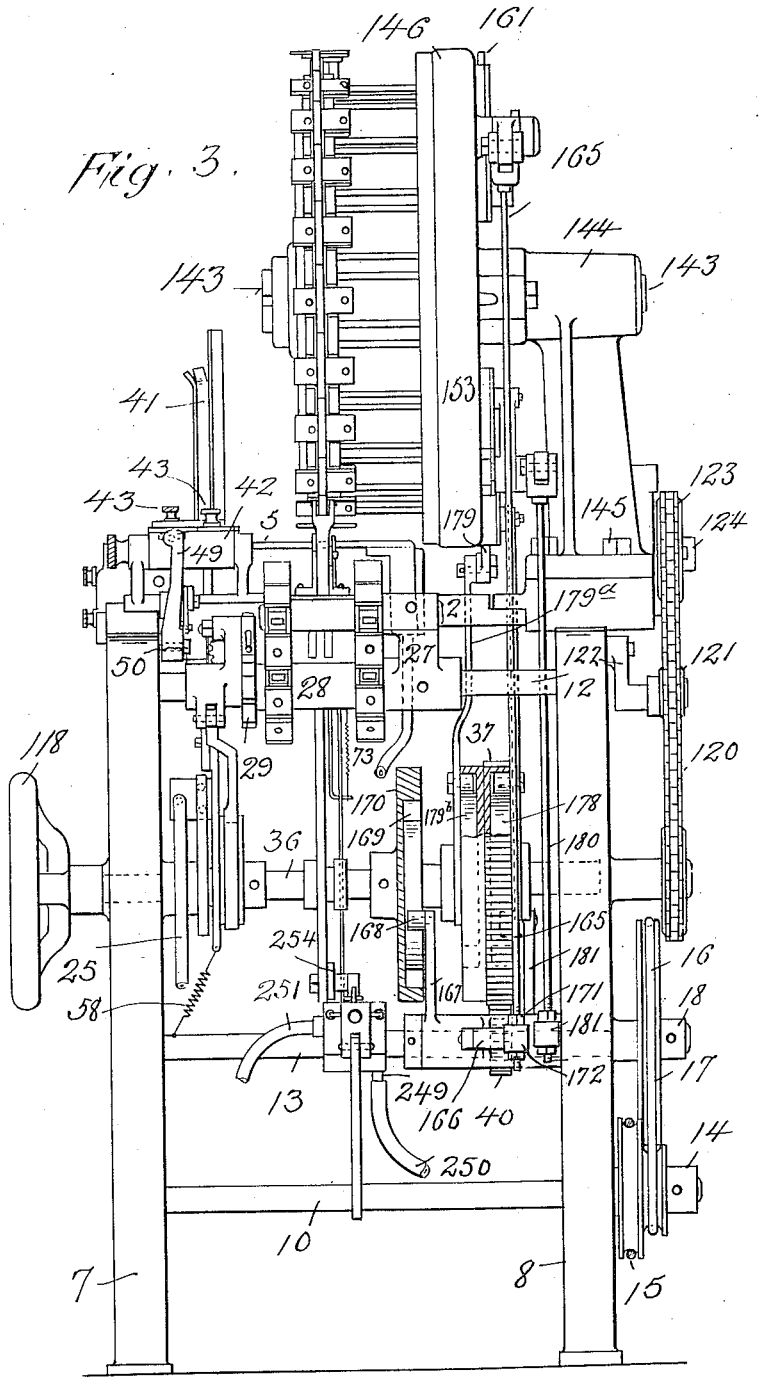

1,261,830.

Patented Apr. 9, 1918.
14 SHEETS—SHEET 3.

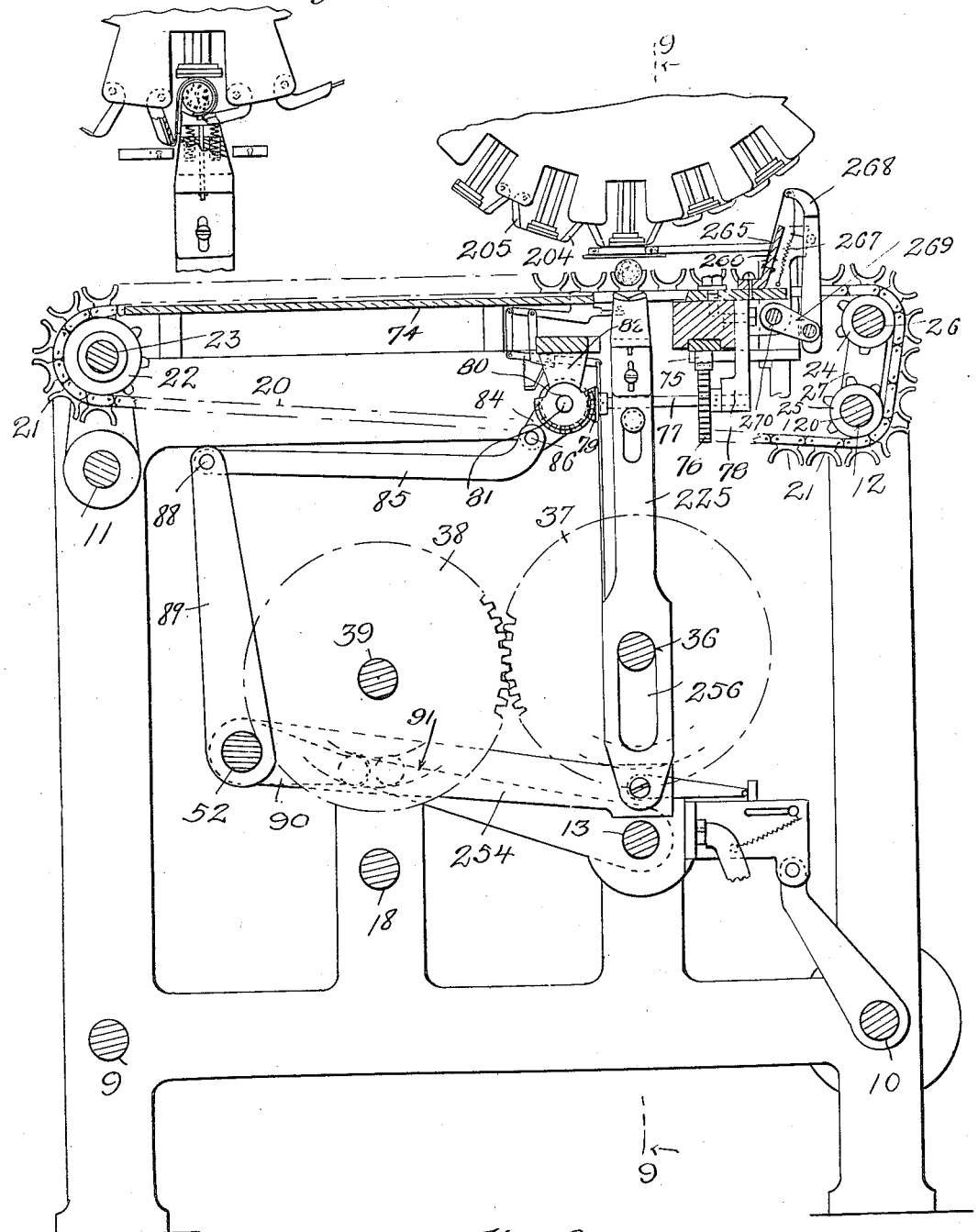

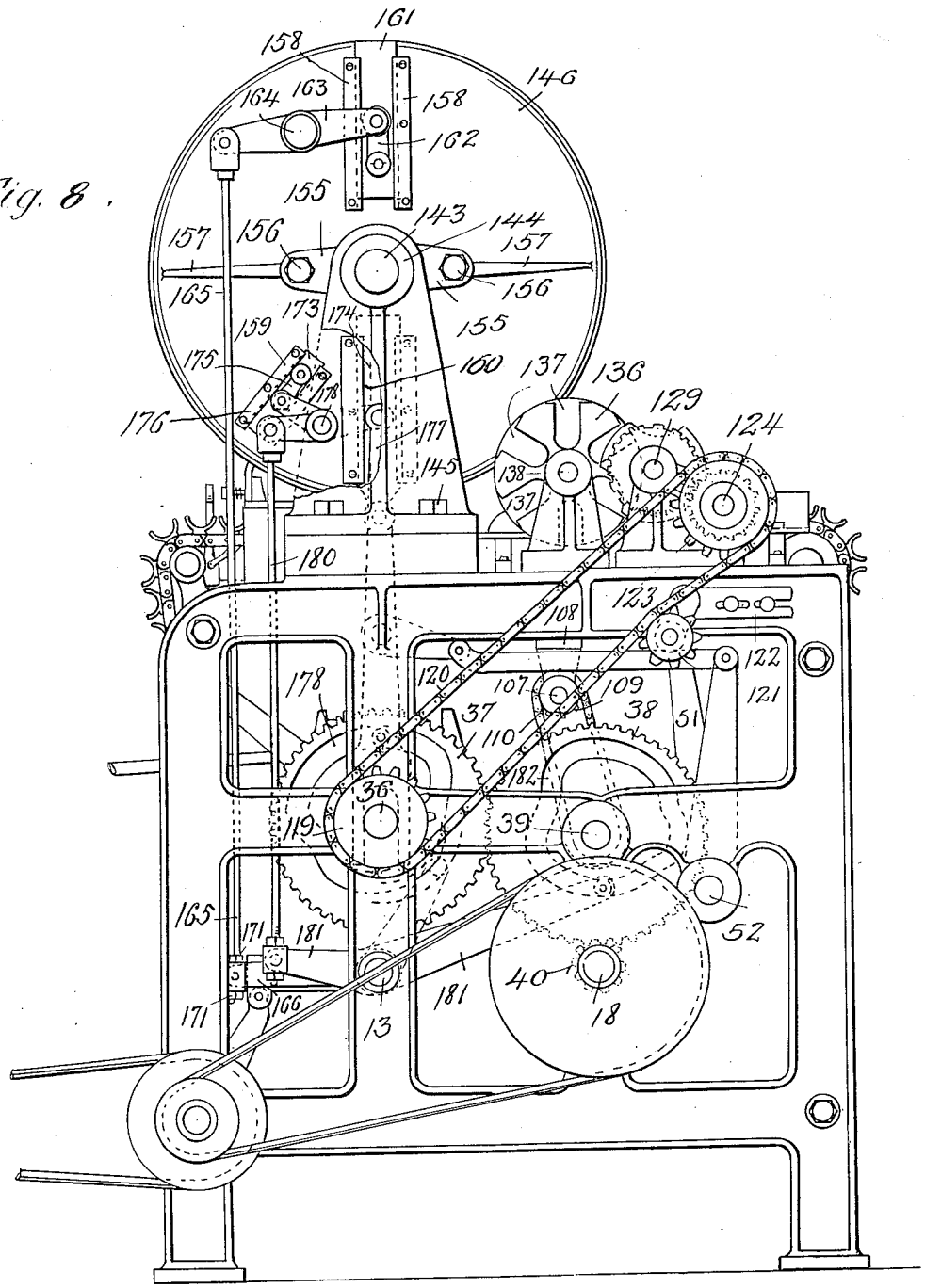

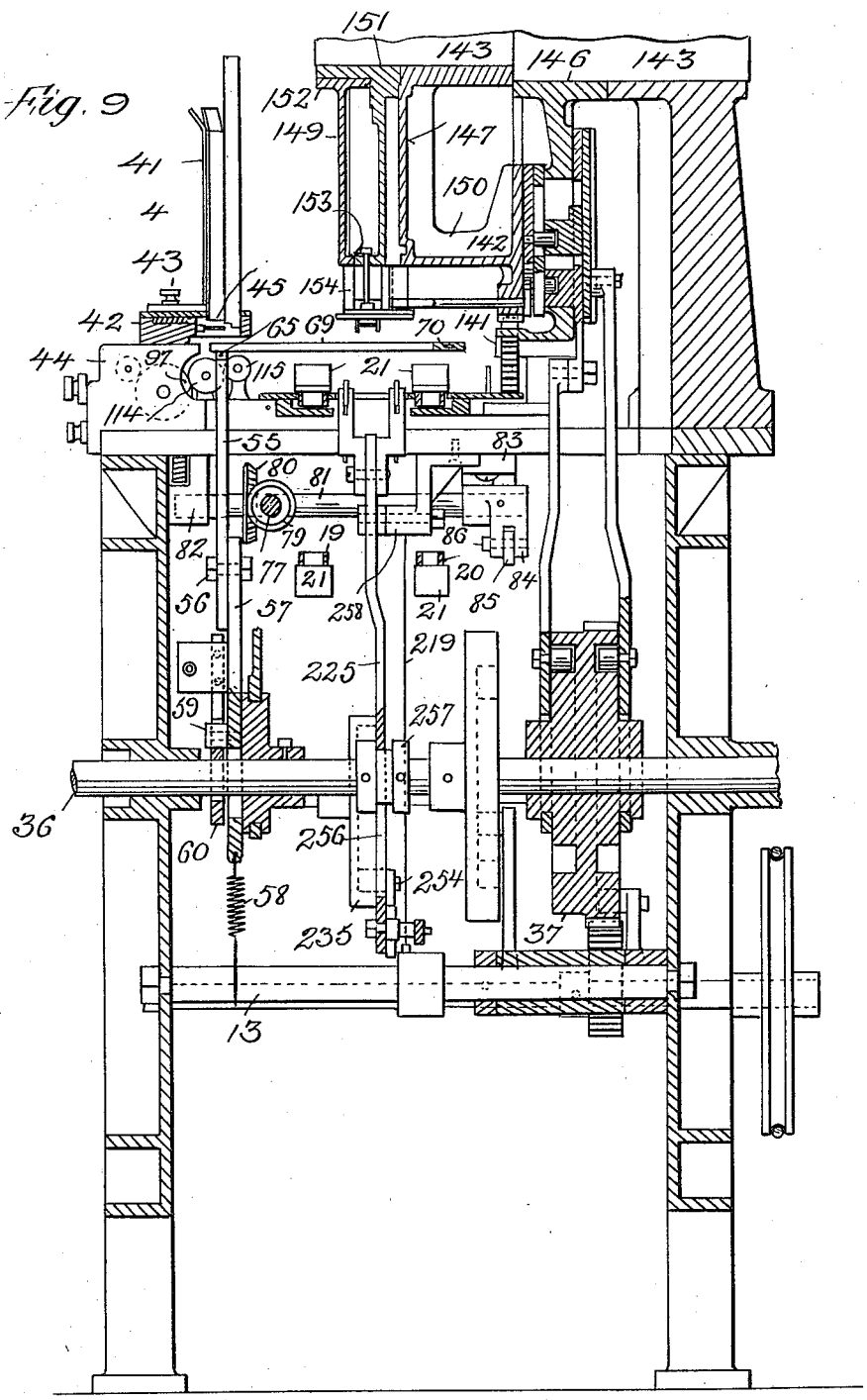

F. X. MALOCSAY.
BANDING MACHINE.
APPLICATION FILED MAY 2, 1912.
1,261,830.
Patented Apr. 9, 1918.
14 SHEETS—SHEET 7.
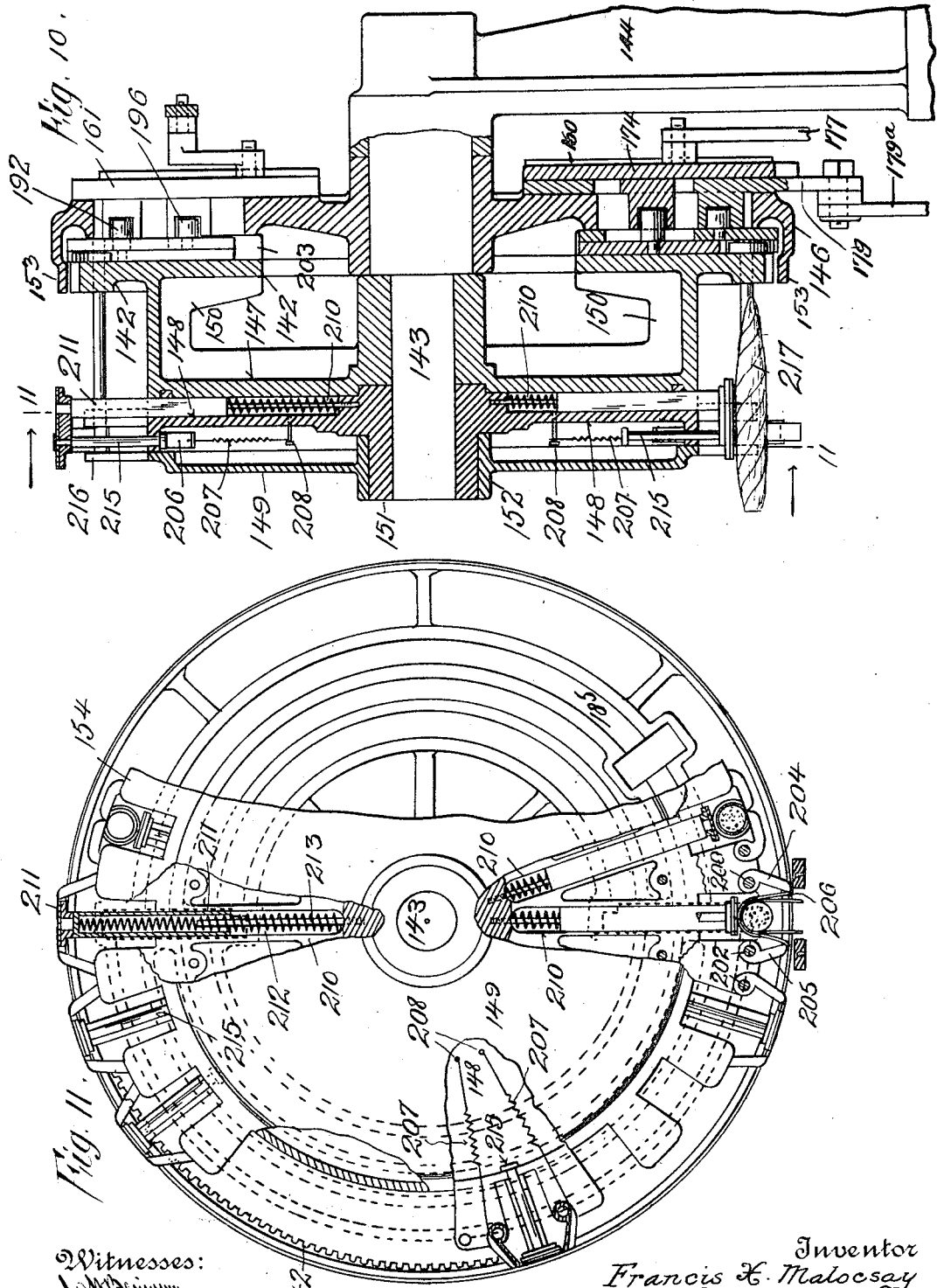
Witnesses:
Inventor
Francis X. Malocsay
By his Attorney
Joseph L. Levy

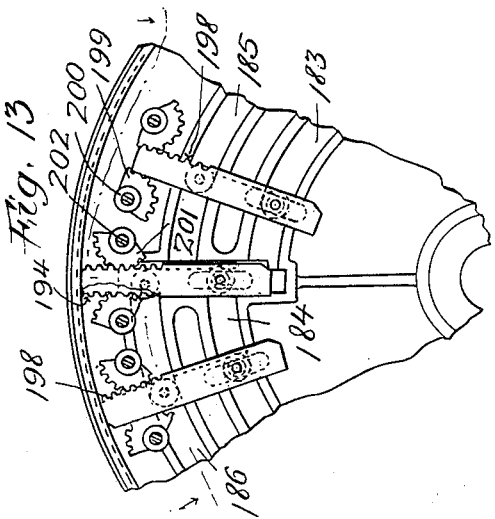
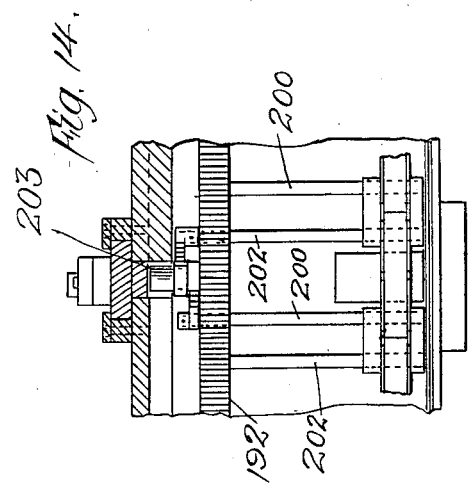
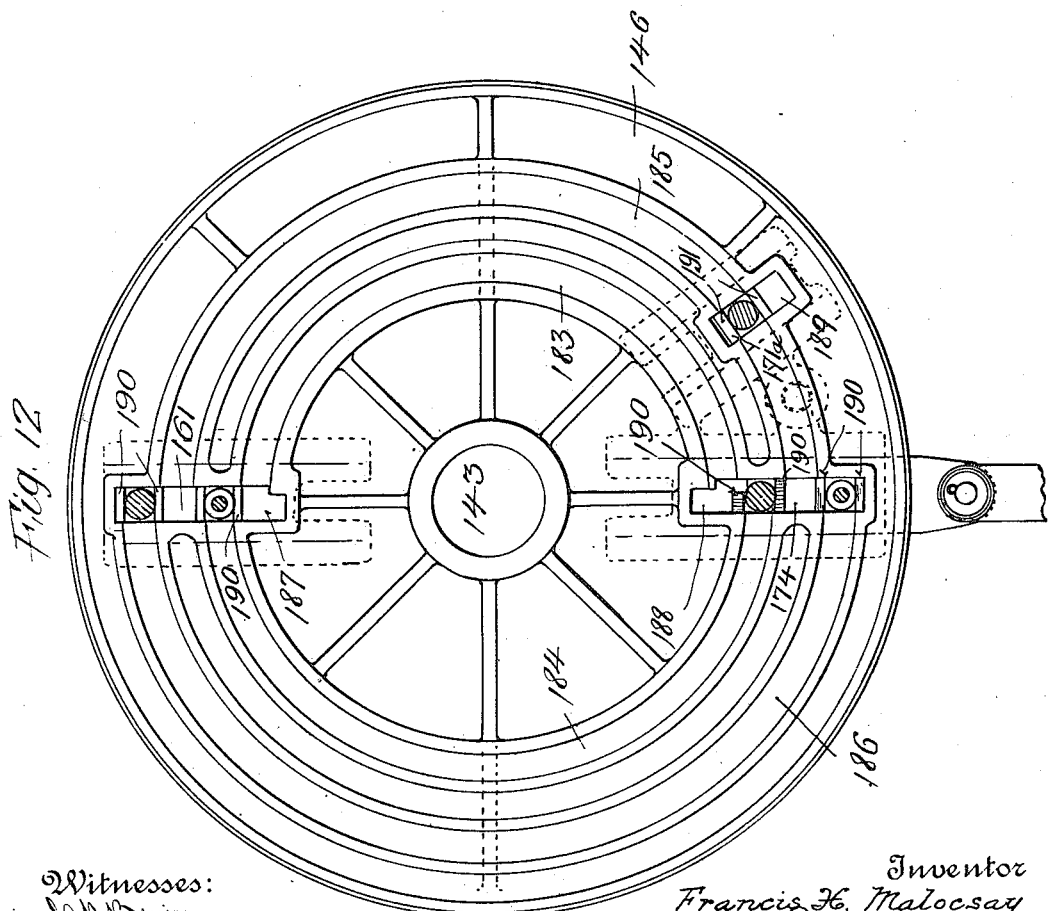

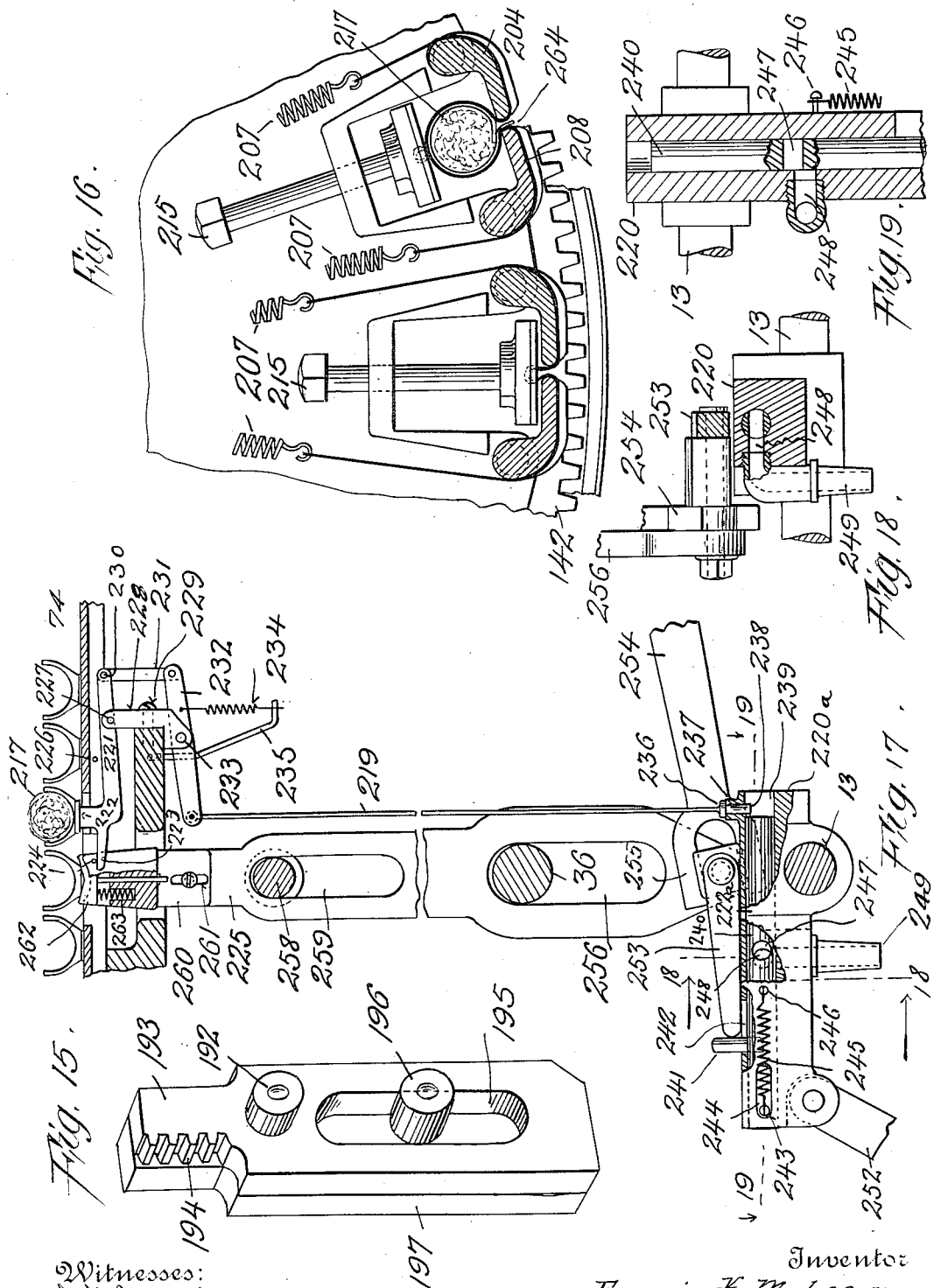

F. X. MALOCSAY.
BANDING MACHINE.
APPLICATION FILED MAY 2, 1912.
1,261,830.
Patented Apr. 9, 1918.
14 SHEETS—SHEET 10.
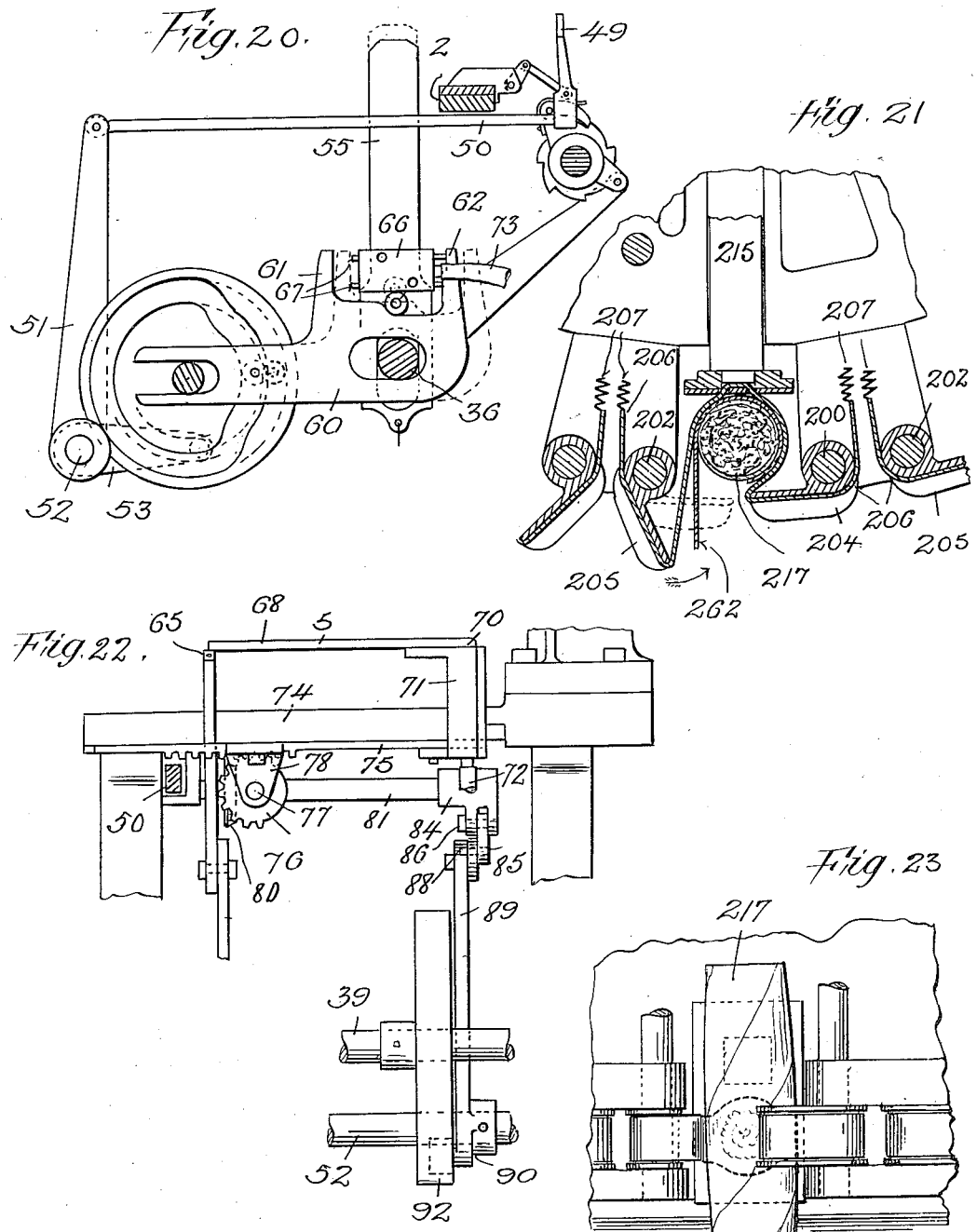

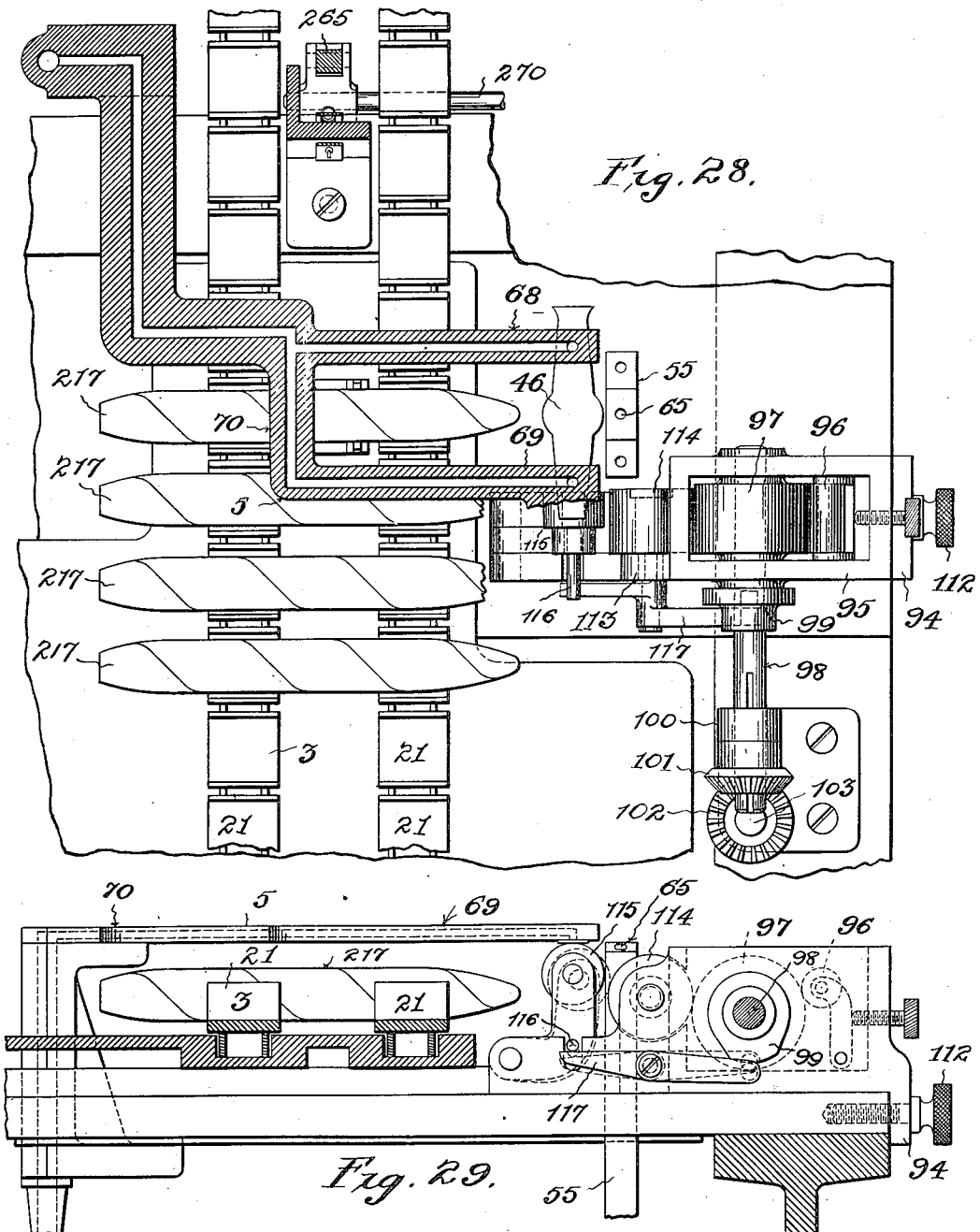

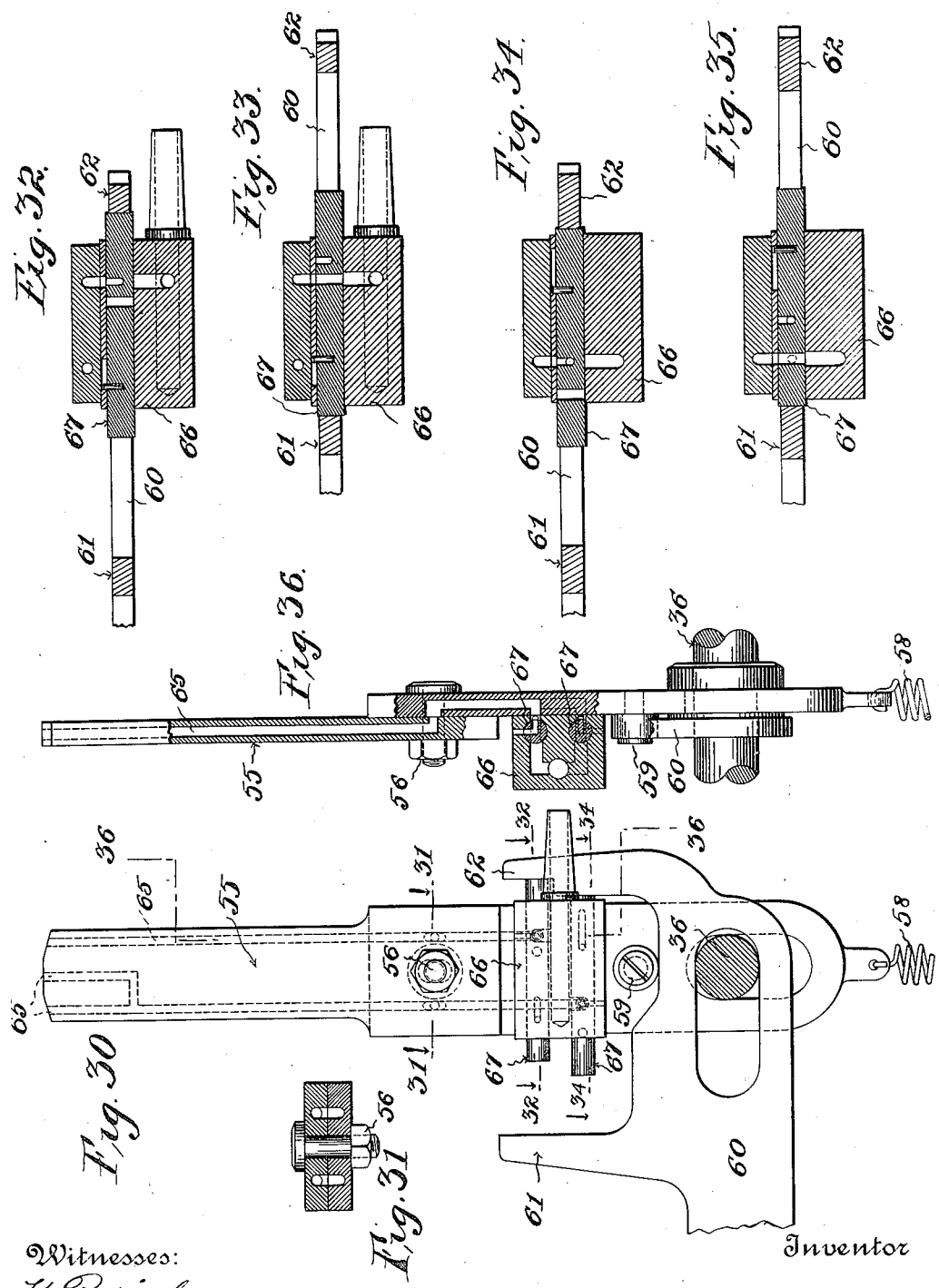

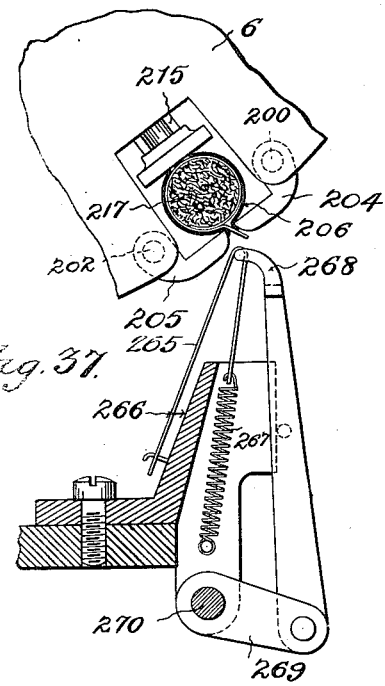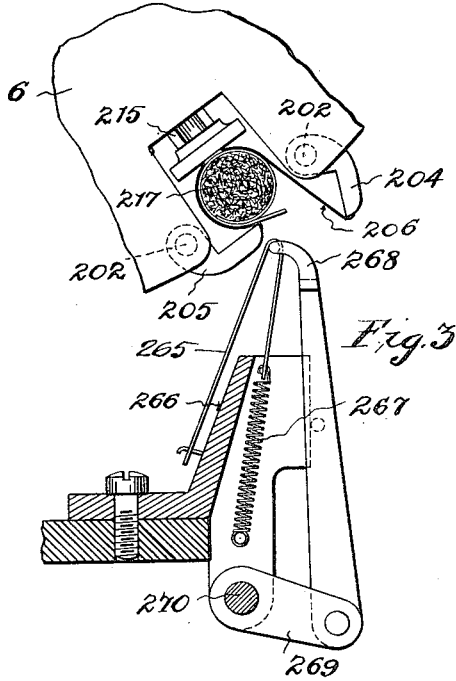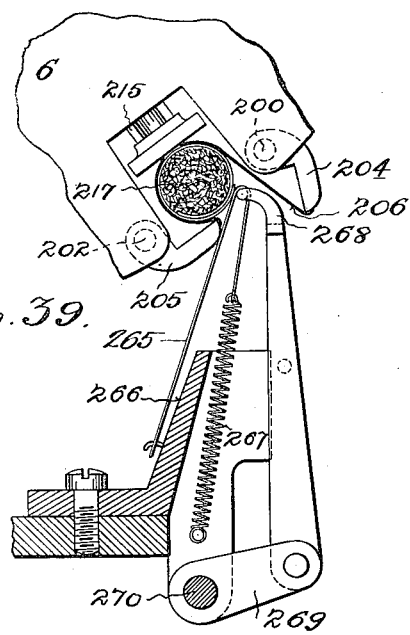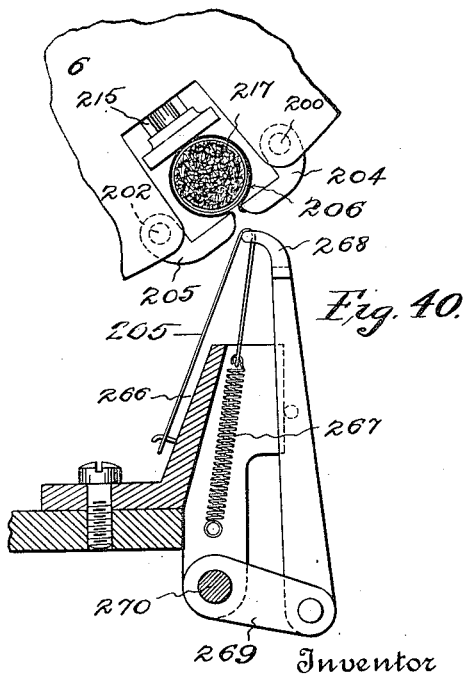

UNITED STATES PATENT OFFICE.

FRANCIS X. MALOCSAY, OF NEW YORK, N. Y., ASSIGNOR TO INTERNATIONAL BANDING MACHINE COMPANY, OF NEW YORK, N. Y., A CORPORATION OF NEW YORK.

BANDING-MACHINE.

1,261,830.　　　　　　　　Specification of Letters Patent.　　　　Patented Apr. 9, 1918.

Application filed May 2, 1912. Serial No. 694,749.

*To all whom it may concern:*

Be it known that I, FRANCIS X. MALOCSAY, a citizen of the United States, and a resident of the city of New York, county of Westchester, borough of Bronx, State of New York, have invented a new and useful Improvement in Banding-Machines, of which the following is a specification.

The object of my invention is to provide a machine of this class which will apply a band to any object within the capacity of the machine without regard to shape, size or irregularities, and to apply the band or label in such a manner that when the objects are assembled, the labels will all stand the same way. A further object is to provide a machine that will never waste a label and will always operate with rapidity and efficiency for an indefinite time, and without undue wear or expense, either for installation or maintenance or attention. These and other objects are accomplished by my invention, one embodiment of which is hereinafter set forth.

For a more particular description of my invention reference is to be had to the accompanying drawings, forming a part hereof, in which—

Figure 1 is a front elevation of a machine embodying my improvements.

Fig. 2 is a detail showing an eccentric and other mechanism for driving the endless conveyers which carry the articles to be labeled.

Fig. 3 is an end elevation of my improved machine.

Fig. 6 is a sectional view taken on the line 6—6 of Fig. 5, looking in the direction of the arrows, a few additional features being shown to more clearly reveal the function of the apparatus.

Fig. 7 is a detailed view showing the banding mechanism a little further advanced in its operation than is shown in Fig. 6.

Fig. 8 is a side elevation of the machine showing the opposite side from that shown in Fig. 1.

Fig. 9 is a sectional view, taken on the line 9—9 of Fig. 6, looking in the direction of the arrows.

Fig. 10 is a sectional view showing a portion of the band applying means or drum.

Fig. 11 is a view taken at right angles to Fig. 10, parts being broken away to more clearly reveal the structure.

Figs. 12, 13 and 14 show details of a cam and some connected parts by which the labeling is controlled.

Fig. 15 shows a pair of slides, the movement of which is controlled by the cams shown in Fig. 12.

Fig. 16 shows a portion of the label applying mechanism of the drum.

Fig. 17 shows the device for preventing a waste of labels, so that no label will be supplied unless there is an article ready to receive it.

Fig. 18 is a sectional view, taken on the line 18—18 of Fig. 17, looking in the direction of the arrows.

Fig. 19 is a sectional view, taken on the line 19—19 of Fig. 17, looking in the direction of the arrows.

Fig. 20 shows a portion of the label separating mechanism and label applying mechanism.

Fig. 21 shows a portion of the label applying mechanism at the time the label is being applied.

Fig. 22 shows the label conveyer and its driving mechanism by which a label is taken from the pile and placed in proper relation to the article to which it is applied immediately thereafter.

Fig. 23 is an inverted plan view of the structure shown in Fig. 21.

Fig. 28 is a plan view showing the conveyer in section, so that its air passages will be revealed.

Fig. 29 is a sectional view of the structure shown in Fig. 28, except that the conveyer is not shown in section.

Fig. 30 is a side elevation of the plunger for separating the lowest band from the remainder of the pile, together with valve mechanism for accomplishing this purpose.

Fig. 31 is a sectional view taken on the line 31—31 of Fig. 30, looking in the direction of the arrows.

Fig. 32 is a sectional view taken on the line 32—32 of Fig. 30, looking in the direction of the arrows.

Fig. 33 is a section similar to the one in Fig. 32, except that the valve mechanism is shown open instead of closed.

Fig. 34 is a sectional view taken on the line 34—34 of Fig. 30, looking in the direction of the arrows.

Fig. 35 is a sectional view corresponding to Fig. 34, except that the valve mechanism is shown open instead of closed.

Fig. 36 is a sectional view taken on the line 36—36 of Fig. 30, looking in the direction of the arrows.

Figs. 37, 38, 39 and 40 show the band securing mechanism in various positions.

Throughout the various views of the drawings, similar reference characters designate similar parts.

Figures 4, 5:
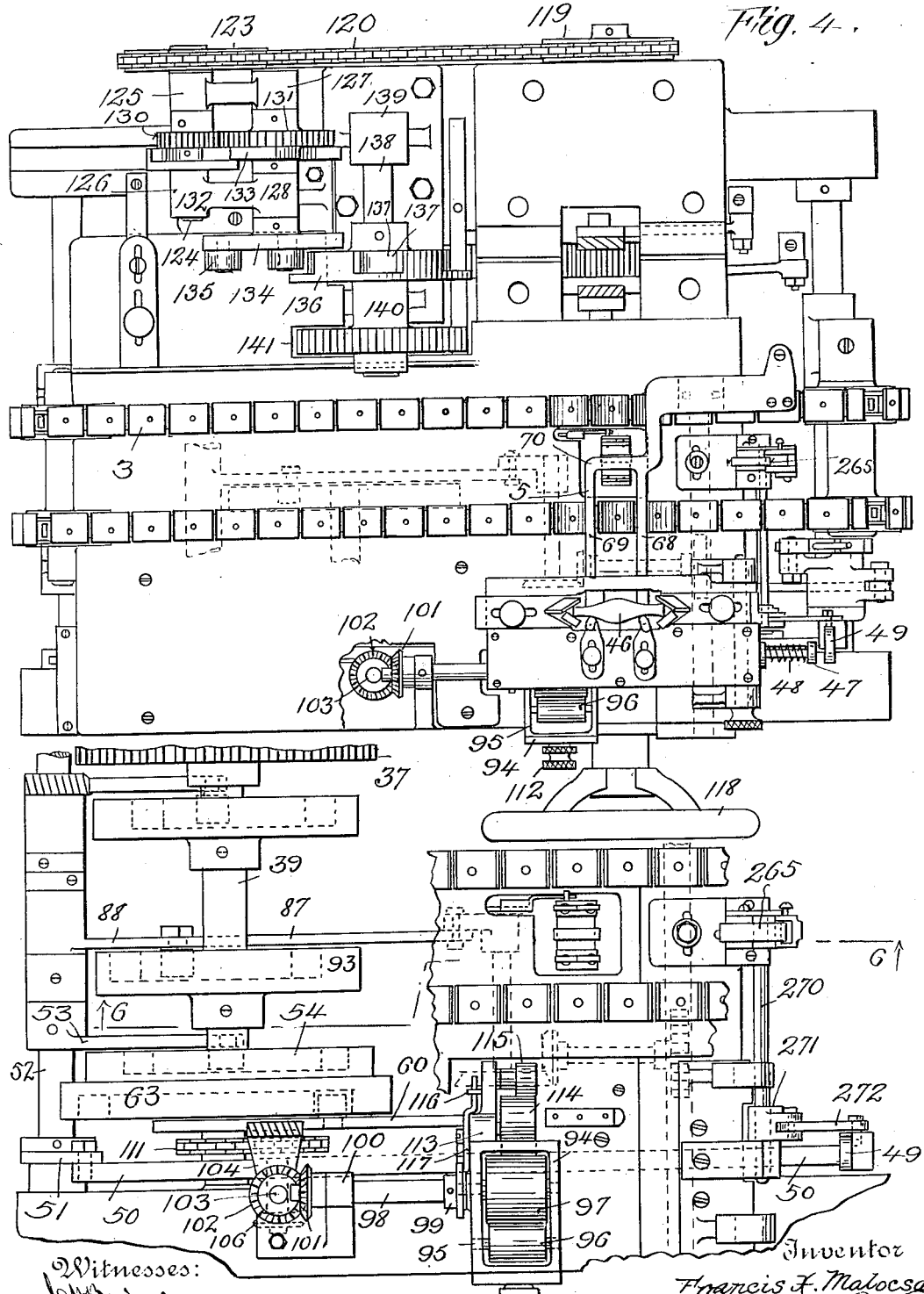
Fig. 4 is a plan view, with a portion removed, showing the conveyers and some of the actuating mechanism.
Fig. 5 is a plan view, parts being broken away to more clearly reveal the structure of a portion of the mechanism shown in Fig. 4.
Figure 24:
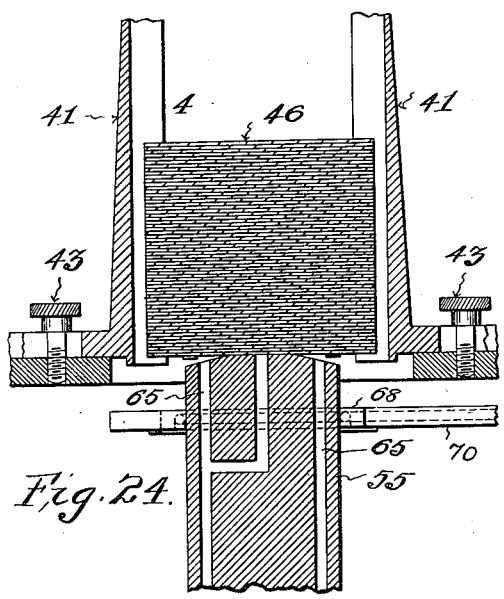
Figs. 24, 25, 26 and 27 are sectional views showing the apparatus for separating the lowest label from the other labels and transferring this lowest label to a suitable conveyer.
Figure 25:
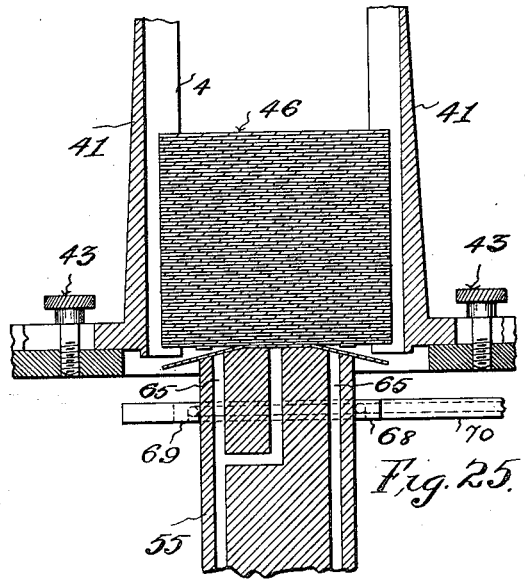
Figure 26:
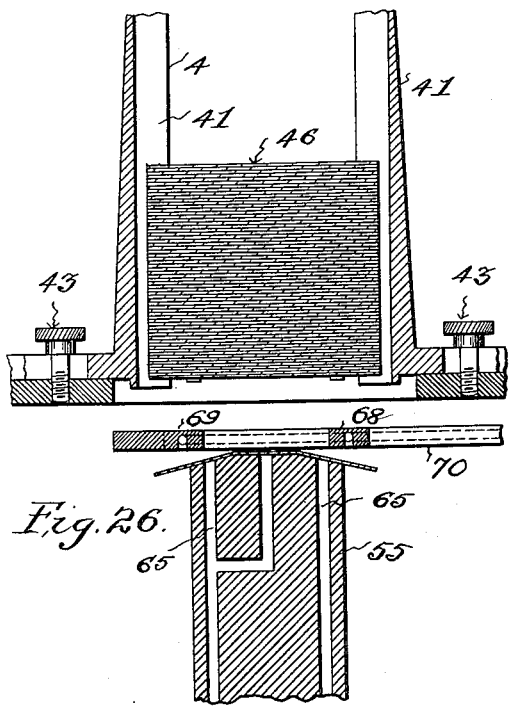
Figure 27:
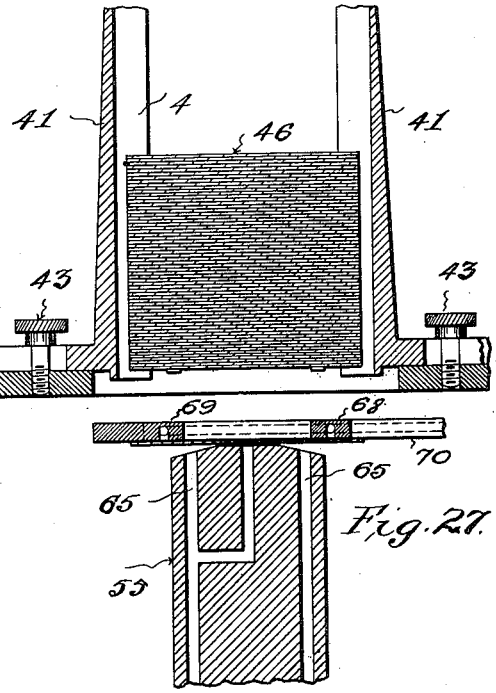

My improved machine 1 comprises a frame 2, a conveyer 3, a label holding magazine 4, label conveyer 5 and label affixing device 6, as well as incidental driving and other mechanism connected therewith.

The frame 2 comprises the side plates 7 and 8 respectively, which are united by suitable bars 9, 10, 11, 12 and 13, as well as shafts and brackets, as will appear below.

The bar 10 is projected so as to carry a coned pulley 14, which receives power from a belt or cord 15 and transmits it by a cord 16, which in turn drives a larger pulley 17 fixed to a shaft 18, which is mounted between the sides 7 and 8 in any suitable manner. The shaft 18 may, for convenience, be designated as the main shaft of the machine, because all other shafts are driven from it.

*The conveyer.*

The conveyer 3 comprises parallel sprocket chains 19 and 20, on which are mounted suitable receptacles 21, which are substantially as shown. These receptacles 21 are made so that they aline with the corresponding receptacles on the other chain so that two of them will properly carry the article to be labeled. The endless chains 19 and 20 at the rear of the machine run over suitable sprocket wheels 22 mounted on a suitable shaft 23, and at the front of the machine they run over suitable sprocket wheels 24 and 25 mounted on a suitable shaft on a bracket 27 and on the crossing 12 respectively. The bracket 27 is fixed to the crossing 12 in any suitable manner, as by a set screw, and the shaft 24 is fixed in this bracket in a similar manner. The sprocket wheels 25 are united by a common boss 28 which is extended beyond the wheel farther removed from the bracket 27 so as to be fixed to a ratchet 29 which is actuated by a pawl 30, which is held by a spring 31 against this ratchet. The pawl 30 is pivotally connected to an arm 32 by an angle lever which oscillates on the crossing or shaft 12, and the other arm 33 of this bell crank lever is pivotally connected to a pitman 34 which is driven by an eccentric 35 fixed to a shaft 36. The shaft 36 is fixed to a gear 37 that meshes with a corresponding gear 38 with the same number of teeth so that it rotates at the same identical angular velocity. The gear wheel 38 is fixed on a shaft 39 above the main shaft 18 of the machine. The gear wheel 37, as well as the gear wheel 38, are provided with suitable cams, as will appear below, and the gear wheel 38 is driven by a suitable pinion 40 fixed on the shaft 18.

From the foregoing, it is apparent that when the shaft 18 is rotated, the shaft 36 is driven at a corresponding speed and the rotation of this shaft 36 through the pawl and ratchet mechanism will rotate the sprocket wheels 25 with an intermittent motion, thereby causing the conveyer 3 to move with a corresponding intermittent movement so that the holders 21 arrive successively and remain momentarily beneath the label fixing device, which will be described below.

*Label magazines and conveyer.*

The label magazine 4 has to be made adjustable according to the size and the shape of the label which is to be applied by the machine. In the embodiment of my invention herein shown I employ a number of uprights 41 which are adjustably mounted on a base 42 by means of a suitable cap screw 43 substantially as shown. The base 42 rests on and is fixed to the casing 44 which carries the water or paste used in the apparatus. The base 42 also projects over a portion of the mechanism which rises and falls thereunder, and another portion of the mechanism which moves transversely thereof and underneath in a manner which will be described below.

This base contains suitable fingers 45, two being preferably employed, which under normal conditions support the labels 46 which are to be affixed, and these fingers 45 are moved at the proper time from under the labels 46 by means of a suitable cam on a rod 47 (see Fig. 4), the outer end of which is surrounded by a coiled spring 48 which normally keeps this rod so that the fingers 45 are under the labels 46 except when the rod 47 is shifted against the tension of the spring 48 by a pusher 49, which is driven by mechanism that will now be described.

The pusher 49 is fixed to a rod 50 (see Fig. 20) that runs toward the rear of the machine where it is pivotally connected to a lever 51 fixed on the shaft 52, and an arm 53 fixed to this shaft 52 carries a suitable roller which engages a cam 54 (see Fig. 5)

and this cam 54 is fixed on the shaft 39 which is driven by the gear-wheel 38 in the manner above described.

The cam 54 is so arranged, disposed and constructed that it will cause the pusher 49 to act at the proper time so as to withdraw the fingers 45 from under the labels 46 in the manner which I will now describe.

Below the labels 46 is a plunger 55 that has no movement save in a vertical direction. Its lower end is secured by a bolt 56 to a suitable guide 57 which slides on the shaft 36, and the lower end of this guide 57 is connected to the crossing 13 by means of a coiled spring 58. The slide 57 has a pin 59 adapted to engage a cam plate 60 (see Fig. 20) that reciprocates on the shafts 36 and 39. This cam plate 60 has upwardly extending arms 61 and 62 operating air valves in a manner which will be described below, and it will be noted that this sliding cam plate 60 has a cam midway between the arms 61 and 62, and is higher near the arm 61. This cam plate 60, sliding as above described, has a roller entering a cam groove in the disk 63 so that this cam plate 60 is shifted once every revolution of the disk 63, and its movement is somewhat irregular as indicated by the shape of the cam groove as shown in Fig. 20. The plunger 55 rises just when the fingers 45 are withdrawn and momentarily carries the labels, but as the plunger 55 has risen or after its center is at the level of the fingers 45, the labels are not moved except that the lowest label is pressed down against the plunger 55, which is hollow and has suitable ports 65 which are connected together and also to the valve chamber 66 near the base of the plunger 55. The valve chamber 66 has a pair of stems 67 which are opened by the projections 61 and closed by the projections 62 on the cam plate 60. These projections and the stem 67 are so arranged and disposed that as soon as the fingers 45 are withdrawn an exhaust takes place through the ducts 65, and this pulls the ends of the lowest label down upon the inclined surface of the plunger 55. The fingers 45 then return between the bent ends of the lowest label and the remainder of the pile. The plunger 55 is then lowered slightly through the incline in the cam plate 60, as above pointed out, and then the label conveyer takes the label from the plunger 55.

The label conveyer 5 comprises two parallel arms 68 and 69, both of which are hollow and provided with suitable ports at their extreme ends which are adapted to pass over the end of the plunger 55, but not to touch the same so as to leave sufficient space for the label which is removed in the manner described below.

The branches 68 and 69 are united by a crossing 70 (see Figs. 4 and 22) which runs in an offset direction to a slide 71 to which it is secured by suitable screws or any other proper means. The slide 71 is hollow and provided with an exhaust tube 72 which runs to any suitable apparatus which may be an air-pump of any kind.

The under side of the slide 71 is provided with a suitable rack-bar 75 to which it is fixed by screws or any other suitable means, and this rack-bar meshes with a segmental gear 76 carried on a suitable shaft 77 mounted in suitable brackets 78 on the lower surface of the table 74 of the machine. The shaft 77 also carries a bevel gear 79 which meshes with a corresponding bevel gear 80 fixed on a shaft 81. This shaft 81 is journaled in suitable bearings 82 and 83 carried by the table of the machine, and the free end of this shaft 81 is provided with a crank 84 which engages a link 85 through the agency of a suitable crank pin 86. This link 85 runs to a pin 88 on a crank 89 which runs to the shaft 52 and is loose thereon, and does not partake of the movement thereof. The crank 89 is also fixedly connected to a crank 90 provided with a suitable cam pin or roller 91 that takes in a groove in a proper cam 92 mounted on the shaft 39 which is run as above set forth. The groove in the cam 92 is so shaped that it will drive the roller 91 and through it the cranks 90 and 89, the link 85, the crank 84, the shaft 81, bevel gear 80, bevel gear 79, shaft 77, segmental gear 76 and through that the rack 75. The shaft 77 is not driven with a rotary but with an oscillatory motion as is apparent, and the cam 92 is so arranged and disposed and shaped that the carrier 5 will take the label from the plunger 55 transversely of the machine by means of the exhaust through the ports in the arms 68 and 69. The exhaust is not shut off from the conveyer 5, and a label is held in a suitable position for application to the article to be banded, as will appear below.

*The wetting or pasting device.*

Where the bands are provided with an adhesive which is merely moistened, as is usually the case, there must be means provided for moistening at the appropriate time. Where the bands come without any such adhesive, it must be applied at the appropriate place and time. The difference between a moistening and a paste applying mechanism is not great, and is obvious to those skilled in the art, so it will not be necessary to describe more than a moistening device, and if so desired, this may be changed for a pasting device operating in the same way and made in the conventional manner.

The moistening device 94 has a suitable vessel 95 in which are mounted a number of rollers 96, the lowest one of which runs in water or any other suitable liquid. The principal roller 97 is mounted on a shaft 98 which is provided with a cam 99, fixed thereon, and is journaled in a bearing 100 at one end, and the casing 95 at the other. The exposed end of the shaft 98 is provided with a bevel gear 101 which meshes with a corresponding gear 102 that runs on a suitable vertical shaft 103 journaled in a suitable bearing 104. The lower end of this shaft 103 is provided with a suitable bevel gear 105 that meshes with a corresponding gear 106 (see Fig. 5) on a small stud shaft 107 (see Figs. 1 and 8) mounted in a suitable bracket 108 secured to the frame of the machine or to any other suitable part. The stud shaft 107 carries a sprocket-wheel 109 which engages a chain 110 which also engages a corresponding sprocket 111 on the shaft 39, (see Fig. 5) so that the shaft 98 is driven indirectly from the shaft 39 and preferably at the same speed. The casing 95 is provided with a suitable adjustable screw 112 by which it may be put in any desired position within the limits of the adjustment. The gear 101 is mounted on the shaft 98 with a key and slot connection which does not interfere with this adjustment. The gear 101 does not shift but the shaft 98 does. The casing 95 also carries a suitable projection 113 on which is journaled an intermediate roller 114 which projects from a corresponding opening in the casing 95 so as to engage or press against the roller 97 and convey moisture therefrom to the applying roller 115 which is mounted with its shaft in a slot of the projection 113 so that it may rise or fall a short distance. A pin 116 projects from the bearing of this roller 115 and is engaged by a lever 117, the other end of which engages the cam 99 so that at the proper time, when the lever 117 is shifted, the roller 115 will be brought in contact with the roller 114, and slightly raised so as to moisten the gummed strip of the band and then retreat from the same so as to cease to moisten anything, and be separated from the roller 114 and ready for the next operation identical with what has just been described.

*Label affixing mechanism.*

One end of the shaft 36 is provided with a hand-wheel 118 by which the apparatus may be turned by hand for the purpose of adjustment or otherwise, and at the other end of this shaft is a sprocket wheel 119 which carries a chain 120 with a suitable idler 121 mounted on any suitable support 122 in any adjustable manner so as to take up the slack and this chain 120 engages a second sprocket wheel 123 on a shaft 124 and runs the same, and the shaft 124 is suitably journaled in bearings 125 and 126 which are connected to similar bearings 127 and 128 in which is mounted a parallel shaft 129. The shafts 124 and 129 are connected by suitable gear wheels 130 and 131 which are interrupted gears so that while the shaft 124 revolves continuously and in one direction, the shaft 129 revolves intermittently in the opposite direction. Suitable cams 132 and 133 on the shafts 124 and 129 respectively, permit an exact movement of one-third of a revolution or 120° of the shaft 129 at each movement and no more and no less. One end of the shaft 129 away from the chain 120 carries a disk 134 on which are mounted suitable rollers 135 in the usual manner. These rollers 135 are at the same distance from the center of the shaft 129 and are separated 120° and each is adapted to engage a corresponding groove in a cam 136. Each of these grooves 137 in the cam 136 is radially disposed and this cam is so proportioned with regard to the disk 134 and the positions of the rollers 135 thereon that each movement of the disk 134 will cause half the annular movement of the disk 136, that is, 60°. The disk 136 is fixed to a shaft 138 mounted in suitable bearings 139 and 140 respectively on the table 74 of the machine. One end of the shaft 138 carries a gear wheel 141 which is fixed on this shaft in any suitable manner and this gear 141 engages a larger gear 142 of the label-affixing mechanism. This gear 142 revolves on a suitable stud shaft 143 mounted in a suitable pedestal 144 which is secured to the bed of the machine by suitable bolts 145. The gears 142 and 141 are so proportioned that each movement of the gear 142 will cause the labeling mechanism described below, to shift the distance between the center of one holder 21, and the next so that the holders and affixing mechanism will work in unison one with the other.

Concentric with the gear wheel 142 is a cam disk 146 and concentric to the gear 142 and mounted on the same shaft revolving with the same but separated therefrom are additional disks 147, 148 and 149 all of which are concentric with the shaft 143, and revolve about the same, the disk 147 being integral with the gear 142 and connected to it by spokes or ribs 150, and the disks 148 and 149 being connected together, the disk having a suitable boss or hub 151 on which is mounted a concentric and corresponding hub 152 of the disk 149. The disk 146 is also provided with an annular flange 153, and the disks 148 and 149 have projecting spokes 154 with recesses between them to receive articles. The disk 146 is fixedly mounted on the stud shaft 143 which does not revolve so that the cams on this disk are fixed. The disk 146 is also fixed by means of suitable ears 155 running from the pedestal 144, which are provided with suitable bolts 156 which pass into webs 157 which run radially on this disk 146.

By turning to Fig. 8 it appears that the back of the disk 146 has three pairs of guides designated 158, 159 and 160, respectively, the first being at the top, the next a little to the left of the bottom, and the last at the bottom. All these guides are held in place by means of screws or other suitable means and each is provided with a slide. The slide 161 at the top of the disk 146 is connected by a small link 162 to a lever 163 and this lever is mounted on a suitable pin 164 in the disk 146. Suitable pins connect the lever and links on each side, one side to the link 162 above described, and on the other to a long link 165 that runs to another lever 166 to which it is connected by a suitable pin. This lever 166 is fulcrumed on the crossing 13, and has a projecting arm 167 with a cam pin 168 that runs in a suitable cam groove 169 in the disk 170 on the shaft 36. The link 165 is made adjustable by being screw-threaded at its lower end and provided with nuts 171 which are placed on each side of the pin 172 which rests in the arm or lever 166. The cam-groove 169 is so shaped, arranged and disposed, that it gives the slide 161 the proper reciprocations at the proper time for a purpose that will appear below.

In a similar way the slide 173, between the guides 159 is shifted in the following manner: The slide 173 has a link 175 connecting it with a bell crank lever 176. This lever 176 is also connected in a suitable manner to the long link 180 which is connected to a lever 181 in a manner similar to the connections between the link 165 and the lever 166. The lever 181 is fulcrumed on the crossing 13 and provided with a suitable cam roller at its other end which takes in a groove 182 in the gear wheel 38 on the shaft 39. The slide 174 is moved by a link 177 with a cam roller engaging a cam groove 178 in the gear 37, as shown in Fig. 8.

The functions of these respective slides 161, 173 and 174 will appear below. The slide 174 has a coöperating slide 179 which will be described hereafter. This slide is actuated by a link 179$^a$ driven by a cam roller and corresponding groove 179$^b$ in a blank fixed to the gear 37. At present it is sufficient to say that these slides actuate the article-clamping device so as to cause them to grasp or release or partially grasp or partially release an article to which a label is being applied when the machine is in operation.

The fixed cam 146 has several circular grooves some of which are operative and some of which are inoperative. The inoperative ones need not be noticed further than to say they are closed at each end, but the operative ones, beginning nearest the center in Fig. 12, are numbered 183, 184, 185 and 186. At the top and bottom these circular slots are connected by suitable radial slots 187 and 188 which extend clear through to the slides 161 and 174, respectively. An additional slot 189 the axis of which is at an angle of 36° to the axis of the slot 188 extends from the circular slot 185 toward the periphery of the disk 146. The slide in this slot is numbered 171$^a$. The slides 161, 174 and 179 are provided with suitable projections 190 which are adapted to register with the walls of the slots 184, 183, 185 and 186 respectively. The slide 171$^a$ has corresponding flanges or projections 191 for the same purpose. When the machine is in operation the grooves 185 and 186 coöperate, that is a cam-roller goes from one to the other and the reverse, and another cam-roller goes from the groove 183 to the groove 184 and the reverse, the transfer being made by the slides 161, 174 and 179. The slide 171$^a$ moves only one cam-roller out of the groove 185 for a purpose that will appear below. The other slides always move two cam-rollers, the slide 161 moving them simultaneously and the slides 179 and 174 successively, the former acting first.

By referring to Figs. 13, 14 and 15, the structure will be made more clear. The cam roller 192 is rotatably mounted on a slotted rack-bar 193 with suitable teeth 194 and slot 195. The longer cam-roller 196 projects through the slot 195, and is guided thereby and is fixed to the rack-bar 197, the teeth 198 of which project in the opposite way from the teeth 194. The teeth 194 are adapted to engage the segmental gear 199 fixed on a small shaft 200, and the racks 198 are adapted to mesh with suitable segmental gears 201 on shafts 202; and these respective shafts 200 and 202 are mounted in the rotatory gear 142 as shown in Fig. 10 and elsewhere. The rack bars 193 and 197 are mounted in suitable radial slots 203 on the rear face of the gear 142 so that the cam-rollers 192 and 196 can readily enter the respective grooves 185, 186, 183 and 184. As the gear 142 rotates about the shaft 143 when the respective rack bars reach the slots 187 and 188, these slides 161, 174 and 179 shift these rack bars so that their cam-rollers go from one set of grooves to the other with the result that these rack bars are moved radially. When they reach the slot 189 the bar 193 alone is shifted radially, out and back, the slot 195 permitting this movement with regard to its companion rack bar 197. The cam-grooves 178 and 179$^b$ are so shaped that the slides 174 and 179 do not move simultaneously in a radial direction, but successively, the slide 179 moving first. The oscillation of the shafts 200 and 202 always depends upon the movement of the rack-bars, as is obvious.

In Fig. 13 these rack-bars are shown at the right with their cam-rollers in the slots 183 and 185. The next set of bars to the left are shown with their cam-rollers in the 180 slide 161 in which they have just been shifted radially so as to be about to enter the slots 184 and 186 respectively, and the third set showing the bars in this position—that is with their cam rollers in these slots 184 and 186. The cam mechanism connected with the slide 161, above described, is so arranged, designed and proportioned, that this slide will always perform this function during the intervals between the movements of the gear 142. As shown in Figs. 14, 21, 23 and elsewhere the shafts 200 and 202 have at their outer ends suitable tension fingers 204 and 205 respectively, and tapes or bands 206 held by springs 207, one spring at each end which springs 207 run to suitable projections 208 on the disk 148. The rear of the disk 148 is slotted with radial slots 210 parallel to the radial slots 203, and these slots 210 each carry a plunger 211 which presses outwardly and radially under the tension of a suitable inclosed coiled spring 212 on a suitable radial pin 213 so that under normal conditions, when the cam rollers 192 and 196 are in the grooves 184 and 186 the fingers 204 and 205 are thrown outwardly. The tapes 206 are secured to their respective plungers 211 so that when these plungers are in their inner position—that is when the cam rollers 192 and 196 are in the grooves 183 and 185 the plungers 211 will be inside the fingers 204 and 205 and if an article is inclosed by the tape 206 the plunger 211 will press the tape against the article and the springs 207 will pull the tape taut against the article regardless of any irregularities in its shape or size provided that it is within the scope of the apparatus as the elasticity of the springs 207 is sufficient to compensate for all irregularities. Each slide 211 is prevented from turning or moving too far by a suitable spindle 215 which has a bolt-head going through a suitable perforation of the flange of the disk 148. The disk 148 is provided with suitable projections 216 in which the outer ends of the shafts 200 and 202 are journaled.

In the foregoing has been described the apparatus for placing the tapes 206 about an article 217 to which the label is to be applied. It is necessary to place the label as above described above this article 217 and then force the article and label together so that they will be embraced by the tape 206. It is also necessary to have the fingers 204 close first so that the band or label will have its ends overlap. It is also necessary to have the fingers 204 open and permit a device to go against the exterior lap and force the same down, and then to restore the fingers 204 to position. This opening and closing takes place at the slot 189 through the action of the slide 171ª which moves under the influence of a cam as above set forth.

The mechanism on the bed of the machine coöperating with the rotary part of the label-applying device is as follows: The conveyer 3 having received the article to be labeled in the supports 21, passes it progressively along the machine while carried by these supports until the label applying means is reached. Just before coming to the plunger for elevating the article 217 away from the carrier 3 this article presses on a suitable set of levers 218 as shown in Fig. 17 which are connected by a small rod 219 to the valve casing 220 from which air flows from the plunger 55. These spring fingers 218 are so arranged that if no article is placed in the carrier on the supports 21 immediately preceding the action of the rotary label affixing device, air is shut off from the plunger 55 and conveyer 5 so that no label is brought to the label affixing device and no labels are wasted.

More specifically, the structure is as follows: The lever system 228 comprises a horizontal lever 221 with an upwardly extending end 222 which is adapted to impinge against the article, and this lever also has a horizontally disposed section 223 adapted to engage a stop 224 on the elevator 225 which will be described in detail below. The upward movement of the lever 221 is limited by a fixed stop or pin 226 fixed in the table 74 of the machine. The lever 221 is fulcrumed at 227 in an upright 228 fixed to the frame of the machine by a screw 229 or in any other suitable manner, and the other end, or what might be designated the free end of this lever 221 has a pin 230 connecting it to a link 231, and this link 231 is at its lower end pivotally connected to a second lever 232. This lever 232 is fulcrumed at 233 to a part of the projection 228 and its free end is engaged by the link or rod 219. A coiled spring 234 connects the lever 232 with a bracket arm 235 which is secured to the frame of the machine as shown in Fig. 17. This spring 234 causes the projection 223 to rest against the pin 224. The spring 234 is very weak so that if an article 217 rests in or on the conveyer 3 at the place immediately preceding the next banding operation, the projection 223 will not rise with the plunger or elevator 225, but will remain lowered. The lowering of the projection 222 of the lever 221 means a corresponding lowering of the link or rod 219 and an elevating of the end 222 means a corresponding elevation of the rod 219. The lower end of this rod 219 is provided with a shoulder 236 which comes in contact with a corresponding shoulder 237 of the casing of the valve 222ª and the lower end 238 of this rod 219 projects into the bore 239 of the casing. The casing 220ª has a suitable plunger 240 and this plunger has a projecting pin 241 passing vertically through a corresponding slot 242 and a horizontally disposed pin 243 passing through a corresponding horizontal slot 244. The outer end of this pin 243 is engaged by a suitable spring 245, the other end of which is secured to a suitable pin or projection 246 on the casing 220. The plunger 240 has a suitable perforation 247 adapted to register with ports 248 in the valve casing 220$^a$ so that when the opening 247 registers with the port 248 air can flow through the valve 222$^a$ but not otherwise. Air preferably flows out from the nozzle 249 from a pipe 250 and in through a pipe 251 which is connected to the pipe valve 66. When the end 238 is lowered into the bore 239 of the casing 220$^a$ of the valve 222$^a$ the spring 245 will force an end of the plunger 240 against this projecting end 238 at which time the openings 247 and 248 will register thereby permitting the exhaust to take place through the valve 222$^a$. If, however, the rod 219 is raised, as above described, so that the projecting end 238 is withdrawn from the bore 240 then the spring 245 will pull the plunger 240 sufficiently far to prevent the openings 247 and 248 from registering in which event no air can be exhausted through the valve 222$^a$.

The casing 220$^a$ of the valve 222$^a$ is mounted near one end on the crossing 13, and at the other end is supported by a brace 252 which runs down to the crossing 10.

The pin 241 is held by the tension of the spring 245 against a pawl 253 which is flexibly connected to a rod 254 which is oscillated on the shaft 52 by means of a cam 255 with a suitable groove in which is placed a cam-roller from the rod 254 in the usual manner. This cam 255 is placed on the shaft 39.

The arm or rod 254 is pivotally connected to the reciprocating rod 225, referred to above, and moves in unison therewith. This rod 225 is slotted at 256 so it can be placed between suitable guides 257 on the rotating shaft 36, and its upper end also passes between the parts of a suitable guide 258 secured to the table 74 of the machine, in any suitable manner. The guide 258 preferably has a pin passing through a slot 259 in the rod 225 as this is an easy manner of making a reliable structure.

The upper end of the rod 225 must receive articles of various shapes and sizes when raising them vertically from the conveyer 3 into the straps 206, as described above. For this reason it is expedient to mount at the upper end of the rod 225 a crotch 260 and to mount this adjustably by means of a slot and screw connection 261 as shown in Fig. 17. The upper ends of the crotch have suitable crutches 262 supported by suitably mounted spiral springs 263 so that these crutches may have a limited movement in a vertical direction only, as shown in Figs. 9 and 17. At the proper time, according to the groove in the cam 255 which is made of the proper shape and form and suitably placed, the rod 225 will rise and convey an article 217 from the conveyer 3 and will do this immediately after the label carrier 5 has placed a label in the proper position so that the elevating of this rod will cause the label to be placed with the article in a strap 206 which is partially wrapped around the article as shown in Fig. 16. The elevator 225 will always raise the article so that its lower surface is on, or substantially on, a line with the upper surface of the fingers 204 and 205 when closed. This makes unnecessary any adjustment for difference in size or shape of articles labeled. However, under these circumstances there is still the exposed end 264 of the label which is not attached or secured. It remains unsecured until the article in question is placed opposite the slot 189 and then the shifting of the slide 171, as above set forth, will cause a shaft 200 to move a slight angular distance and thereby open a finger 204. This can be done because the opposite finger 205 will hold the label tight and true as this finger comes down after the other when the article is first received so as to provide for the overlapping of the end 264. While the finger 204 is thrown back a small belt 265 is momentarily thrown against the end of the label 264 and presses the same down when the adhesive on the label will act to hold the end properly until the finger 204 can be restored to its normal position through the action of the slide 171, and then the label is properly secured and the article remains clamped in this position until it reaches the highest part of its run when it is ejected from the label-affixing device.

The belt 265 is shown in Fig. 6 where it is secured at one end to a bracket 266 adjustably secured to the bed of the machine and at its other end to a spring 267 which is also connected to the bracket 266. Its intermediate portion passes over a roller carried by an arm 268 which is raised by a crank 269 to which it is connected and this crank 269 is on a shaft 270 (see Fig. 5) which runs to a second crank 271, which is connected by a link 272 to the head 49 which is driven by the reciprocating rod 50 in the manner described above.

*Operation.*

In view of the foregoing, the operation of my improved machine will be readily understood. Assuming the label magazine to be filled with labels and the conveyer 3 to be supplied with articles to be labeled such as cigars, and power to be applied to the machine and an exhaust to the valve 222$^a$ and conveyer 5. The operation is then as follows:—The lowest label of the pile is first separated from the other labels in the manner above described and rests on the plunger 55 and below the fingers 45 which support the remainder of the pile. The plunger 55 is slightly lowered and when lowered is covered by the arms 68 and 69, and while so covered the exhaust is shut off from the plunger 55 and the exhaust applied to the arms 68 and 69 sucks the label and holds it by suction away from the plunger 55. The label is then conveyed immediately over the article to be labeled and then it is over the reciprocating rod 225. The fingers 204 and 205 are already thrown back, a tape 206 has been expanded by the springs 207 and a plunger 211 in the manner above described. The article is then shoved against this tape and the plunger 211 which is only spring-pressed, retreats and the label is then pressed snug against the article by the belt 206, and first the finger 204 is closed down through the action of the rack bar 193 and when this has acted, the bar 197 is moved so as to close the finger 205, the band is in place except for the end 264 which is closed down a little later in the manner described above. The article, with the band thereon, closely wrapped around it is carried to the top of the label affixer where the fingers 204 and 205 are raised by their rack bars 193 and 197, shifting under the influence of the slide 161, as above described, when the springs 207 and 212 act together to raise the plate 211 and expel the article, properly labeled and ready to be packed. The tapes 206 have been held snug about the articles for a sufficient time to fix the labels and allow the paste to set sufficiently to hold.

While I have shown and described one embodiment of my invention, it is obvious that it is not restricted thereto but is broad enough to cover all structures that come within the scope of the annexed claims.

What I claim is:

1. In a machine of the class described, an article conveyer provided with means for holding an article so that it cannot rotate, an article lifter, a label conveyer, a label moistening device and a label affixer having straps adapted to engage a label and hold the same about an article, and means for causing the ends of the label to overlap.

2. In a machine of the class described, an article lifter, a label conveyer provided with means for holding an article so that it cannot rotate, a tape mounted to encircle and hold a label to the article and means for causing the ends of the label to overlap while the rest of the label is held by the tape.

3. In a machine of the class described, a tape and means for mounting the same so that it will wrap a label about an article, means for supplying an article with a label resting thereon, means for causing said tape to wrap the label about said article while the article is stationary, means for partially opening said tape and means for causing the ends of the label to overlap.

4. In a machine of the class described, endless parallel sprocket chains and means for mounting the same, holders 21 carried by said chains, said holders being arranged in pairs so that an article may be carried by two holders, one on each chain, and that when so carried the article will be perpendicular to the chain, means for placing a band about an article and means for raising said article from said holder to the band applying mechanism.

5. In a machine of the class described, a pair of parallel and endless sprocket chains, and means for mounting the same, holders carried by said chains, means for moving said chains with an intermittent motion, means for placing a band about an article and means for raising said article from said holder to the band applying mechanism.

6. In a machine of the class described, a pair of sprocket chains and holders carried by said chains so that an article may be carried by two holders, one on each chain, means for moving said chains with an intermittent motion and a lifter for raising an article from said holders while the chains are at rest and means for applying a band to the article after the same is lifted.

7. In a machine of the class described, an article conveyer, a label conveyer, means for causing the label conveyer to carry a label immediately over an article on the article conveyer, and means for raising the article to the band applying mechanism and a band applying mechanism.

8. In a machine of the class described, an article conveyer, a label conveyer adapted to carry a label and place the same over an article, and means for causing said label conveyer not to convey a label when no article on the conveyer is ready to receive the label.

9. In a machine of the class described, an article conveyer comprising two parallel sprocket chains with holders thereon and means for mounting said chains so that they can move simultaneously with an intermittent motion, a label conveyer, a label magazine and pneumatic means for separating the lowest label in the magazine from the other labels and mechanism connected with the conveyers for rendering the pneumatic separating apparatus inoperative when no article is placed on the article conveyer in a proper place to receive the label.

10. In a machine of the class described, means for carrying an article to be labeled with an intermittent movement, means for conveying a label and adapted to place the same over the article to be labeled, a magazine for containing labels and pneumatic means thereon for extracting the lowest label from the pile in the magazine and levers and other mechanism regulating said pneumatic mechanism in said magazine whereby the air supply is shut off and the pneumatic mechanism is rendered inoperative so that no separation takes place between the lowest label and the rest, and no label leaves the magazine when no article is on the article conveyer ready to receive the label.

11. In a machine of the class described, an article conveyer and means for moving the same intermittently, a label conveyer and means for causing the label conveyer to convey a label transversely of the movement of the article conveyer, means for raising an article against a label and away from both conveyers, and means for moistening the label while carried by said label conveyer.

12. In a machine of the class described, means for conveying an article, means for placing a label above the article, means for raising the article without turning or shifting the same, means for clamping the article and pressing the label about the same, means for causing the ends of the label to overlap and means for ejecting the article in the reverse position from the way in which it was first elevated.

13. In a machine of the class described, a plurality of tapes and a rotary drum for carrying same, fingers connected to said tapes, shafts connected to said fingers, a cam plate and mechanism connecting said shafts and cam plate so that the fingers are periodically shifted when the rotary drum intermittently moves with regard to the cam plate.

14. In a machine of the class described, a label affixer having a drum and provided with a plurality of tapes, means for causing said tapes to encircle an article and label and hold the label against said article, means for causing said tapes to partially uncover an end of said label and a belt and means for forcing the same against the free end of the label to cause it to close down on the label, and means for restoring the tape over the closed down end.

15. In a machine of the class described, a conveyer adapted to convey an article, a label conveyer adapted to convey a label over the article and an elevator with resilient means adapted to elevate the article and conveyer and means arranged so that an irregular article will not be rotated while being elevated by the elevator.

16. In a machine of the class described, an elevator adapted to raise an article from a conveyer and an oscillating arm for reciprocating the same, a pawl pivotally connected to said elevator and oscillating arm, a valve casing, a perforated rod in said casing, a pin projecting from said rod and a spring for causing said pin to engage said pawl and mechanism governed by the absence of an article on a conveyer for preventing said pin from engaging said pawl.

Signed at the city of New York, county of New York, and State of New York, this 30th day of April, 1912.

FRANCIS X. MALOCSAY.

Witnesses:
H. RADZINSKY,
GUSTAVE I. ARONOW.